United States Patent Office 3,786,124
Patented Jan. 15, 1974

3,786,124
METHOD OF SINTERING FUSED SILICA CERAMIC FOR STRENGTHENING IT
Dennis R. Platts, Boalsburg, Pa., assignor to Ceramic Finishing Company, State College, Pa.
No Drawing. Continuation-in-part of abandoned application Ser. No. 785,670, Dec. 20, 1968. This application Feb. 8, 1971, Ser. No. 113,772
Int. Cl. C04b 35/14, 35/64, 41/02
U.S. Cl. 264—65    7 Claims

ABSTRACT OF THE DISCLOSURE

A method of sintering fused silica ceramic, especially slip cast fused silica, for improving the strength of the sintered fused silica ceramic. An unsintered preformed body of fused silica ceramic is subjected, during sintering, to vapor from a heat decomposable fluoride, preferably one taken from the group consisting of aluminum fluoride, cadmium fluoride and zinc fluoride, at a temperature of from 600°–900° C. for a period of time such that the portion of the body which is to have the strength improved is kept at the treating temperature for from 1–4 hours.

---

This application is a continuation-in-part of application Ser. No. 785,670, filed Dec. 20, 1968, now abandoned.

This invention relates to a method of manufacturing fused silica ceramics by sintering a preformed compacted body of finely divided fused silica grains without any appreciable devitrification of the product.

It is a further object of the invention to provide a treatment for fused silica ceramics which improves the bending strength thereof by substantially avoiding the formation of cristobalite, which is formed to a greater or lesser degree during prior art firing processes.

Fused silica ceramic articles are conventionally made by sintering a compacted preform of finely divided fused silica grains or a compacted preform of a combination of fine, medium and coarse fused silica grains, which grains are formed by comminuting fused silica. The fused silica of the grains is amorphous, and this, as well as its very low thermal expansion, distinguishes it from other forms of silica such as cristobalite, tridymite, and quartz. Furthermore, a sintered fused silica ceramic is distinguished from transparent vitreous silica by being white, opaque, and containing continuous pores. Fused silica ceramics may be formed into compacted preforms which are suitable for sintering by slip casting, i.e. so-called slip cast fused silica or SCFS, by dry pressing or by other methods.

In the prior art sintering of silica, it has been necessary to carry out firing at temperatures at which considerable cristobalite has been formed. This greatly weakens the fired bodies, and efforts to date have centered on trying to minimize this condition.

It is, nevertheless, desirable to be able to provide sintered bodies of fused silica ceramics which are stronger than those heretofore available.

It is an object of the present invention to provide a treatment for sintering preforms of fused silica ceramics which improves the bending strength thereof.

A further object of the invention is to provide a treatment for sintering preforms of fused silica ceramics which improves the bending strength thereof by substantially eliminating the cristobalite formed during prior art firing processes.

These objects are achieved by firing or refiring bodies of compacted grains of fused silica ceramic at a relatively low temperature while they are being subject to vapors from a heat decomposable fluoride, for example, by packing the bodies in the fluoride. The treatment has been found to remove a crystal layer from the surface of the fused silica ceramic, and also to increase the sintering thereof, these two effects combining to improve the overall flexural strength of the ceramic.

The invention will be described in greater detail in connection with the accompanying drawing, which is a typical crystallinity gradient for fluorinated sintered bodies of fused silica ceramics and for correspondingly fired controls.

The process according to the invention comprises sintering a preformed body of fused siilca, and especially slip cast fused silica, which is green or which has been initially fired at a temperature of from 1000°–1200° C. for a period of from 1–5 hours, the firing comprising the steps of subjecting the slip cast fused silica body to the vapor from a heat decomposable fluoride, preferably a fluoride taken from the group consisting of $AlF_3$, $CdF_2$, and $ZnF_2$, while firing at least the portion of the body to be strengthened at a temperature of from about 400°–1100° C., preferably about 600°–900° C. The period of time is preferably such that the portion of the body which is to have the strength improved is kept at the treating temperature for from 1–4 hours. If the whole body is to be treated, it must all be kept at the treating temperature. This time can range from as short a time as 30 minutes, for a very high temperature and a relatively thin body, to a period of several days, for very large bodies heated at relatively low temperatures. Where only a portion, for example the outer layer, is to be strengthened, only this portion need be fired at the recited temperature for the recited time. Where the center of a thick body must be strengthened, the outside may have to be at the firing temperature for a longer time while the center reaches and is held at the firing temperature. For a thin body, a short time and a high temperature can be used. The thus fired body is cooled in the furnace or in ambient atmosphere. The bodies to be treated can be fired in the open, i.e. in the furnace, with no muffle, in an open muffle, in a closed muffle, or in a pressurized muffle or bomb. The fluoride should be one which produces sufficient vapor pressure at the firing temperature.

The $AlF_3$, which can be used as one of the materials, can be either an anhydrous $AlF_3$ or the hydrated form $Al_2F_6 \cdot xH_2O$. When the expression $AlF_3$ is used hereinafter, it is understood to refer to both forms of this compound unless otherwise specified.

The crystal content lowering of the surface layer is believed to occur by fluoride vapor etching. The enhanced sintering is believed to occur by an evaporation-condensation mechanism, the strength of the material being related to the fluorinating temperature, duration, and fluoride vapor pressure. A typical crystallinity gradient for sintered bodies of fluorinated fused silica and for correspondingly fired controls is shown in the figure.

In order to determine the effects of these factors, a number of examples were carried out.

EXAMPLES 1–10

One method of varying fluoride vapor pressure is to change the fluoride.

Eighteen groups of plate specimens were prepared by machining from 0.2 inch thick SCFS plates, the specimens having dimensions of 0.2" x 0.3" x 2.5".

The specimens were initially fired by heating them up and then firing them at 1200° C. for two hours in a furnace having SiC heating elements, and then cooling in the furnace. They had a porosity in the range of from 10%–20%.

The specimens in ten groups were packed in various materials described hereinafter and placed in a fireclay closed muffle and then placed in the furnace and refired. The muffle was used in order to control the atmosphere to which the packed specimens were subjected and to protect the heating elements of the furnace.

Thereafter, the specimens in each group were tested for flexural strength by cross-bending modulus of rupture tests on a two inch span with four-point loading.

The specimens of Groups 1, 2, 4, 6 and 7 of the refired specimens were packed in $Al_2F_6 \cdot xH_2O$ and refired at 700° for one hour.

The specimens of Groups 3 and 5 were packed in anhydrous $AlF_3$ and fired under the same conditions.

The specimens of Group 8 were packed in anhydrous $ZnF_2$ and fired under the same conditions, and the specimens of Group 9 were packed in $CdF_2$ under the same conditions.

The specimens of Group 10 were packed in hydrated $AlF_3$ and fired at 900° C. for 1.2 hours.

The remaining eight groups of specimens were refired in air at the corresponding temperatures for the corresponding times to serve as controls.

The average strengths of the four specimens of each group for both the packed and refired specimens and the controls are given in Table I, and it can be seen that in each instance the strength of the packed and refired specimens was significantly increased. The vapor pressures in all of these examples was sufficient to improve the strength.

EXAMPLES 11-15

The fluorinating atmosphere can be varied also by varying the composition of the packing material.

Five groups of plate specimens prepared as described in Examples 1-10 were fired in various atmospheres by varying the materials in which they were packed and corresponding groups of control specimens were fired with them. The specimens of Groups 11 and 12 were packed in $Al_2F_6 \cdot xH_2O$ so that the atmosphere in which they were fired was an atmosphere produced by heating $AlF_3$.

The specimens of Group 13 were packed in the same material and a layer of kaolin was packed over the fluoride.

The specimens of Group 14 were packed in a mixture of arsenic oxide and the fluoride so that the atmosphere was an oxidizing atmosphere, while the specimens of Group 15 were packed in a mixture of the fluoride and graphite so that the atmosphere was a reducing atmosphere.

The results of such variations are given in Table II.

Water vapor is also present in the reaction chamber and the experiment in which kaolin was added to the packing indicates that water vapor in the atmosphere must be controlled. The kaolin was packed on top of the aluminum fluoride packing; they were not mixed. The treating temperature is in the range where raw kaolin loses chemically combined water. The water combined with aluminum fluoride does not appear to present any problems, because the water is given off at much lower temperatures, less than 300° C., and is probably mostly lost before significant reaction rates are reached. The difference in flexural strength results between a reducing and an oxidizing atmosphere is probably not significant. The large difference in the change in thickness is interesting and suggests a competition between fluorine and oxygen for available silicon.

EXAMPLES 16-20

Another way of affecting the fluorinating atmosphere is by using a pressurized container or reaction vessel. Examples 16-19 employed plate type specimens like those of Examples 1-10, but initially fired to only 1000° C. Example 20 employed specimens like those of Examples 1-10 initially fired at 1200° C. The specimens in Example 16 were packed in $Al_2F_6 \cdot xH_2O$ and sealed in a fused silica tube. A Morey-type hydrothermal bomb having an internal volume of fifteen cubic centimeters was used in Examples 17-20. It was filled with $Al_2F \cdot xH_2O$, approximately 10 g., in which was packed the plate-type specimens. Most of the pressure in the bomb results from the water vapor given off by the hydrated fluoride. An estimate of the vapor pressure based only on the water content in a 15 cc. volume is 1-2 kilobars. Results of these tests are given in Table III. It is pointed out that the flexural strength results were obtained on a one-inch span. These strengths are generally 10%-20% higher than those obtained on a two-inch span. Controls for the partially sintered specimens would have strength in the neighborhood of 1500 p.s.i. The fracture surfaces of the slip cast fused silica treated for 2 hours or 5 hours at 650° C. are much smoother than the usual rough surfaces observed for the untreated samples. Apparently the treatments cause a substantial change in the character of the bonding between grains.

EXAMPLES 21-29

In order to determine the effects of the duration of refiring and the refiring temperature on the average flexural strength of the fluoride treated slip cast fused silica, nine groups of plate specimens were prepared with four specimens in each group, one specimen from each of four different plates, the specimens being prepared as described in connection with Examples 1-10. The nine specimens from each plate were selected at random before sintering and the group order of treatment was also selected at random in order to eliminate in so far as possible the errors involved in using specimens from different plates. All specimens were simultaneously sintered by firing at 1200° C. for two hours, and then the specimens of the first three groups, Groups 21, 22 and 23, were fired for one hour at the respective temperatures of 700° C., 800° C., and 900° C. The specimens of the next three groups, Groups 24, 25 and 26, were fired for two hours at the same respective temperatures, and the specimens of the remaining three groups, Groups 27, 28 and 29, were fired for four hours at the same respective temperatures. All groups were cooled in the furnace.

The flexural strengths were tested as described in connection with Examples 1-10. The average strengths are given in Table IV. A control group had an average flexural strength of 2900 p.s.i.

The results of these tests show that the effect of temperature is very significant and the temperature-duration effects of the specimens are also significant. Extended refiring times at high temperature should be avoided. Conditions more severe than 4 hours at 800° C. should be avoided.

EXAMPLES 30-35

The highest strength value for the fluorinated plate specimens occurred after treatment at 700° C. Duration at that temperature was studied in more detail, again using sintered plate specimens prepared as in Examples 1-10 and in $Al_2F_6 \cdot xH_2O$. No muffle was used, and the specimens were set directly into a furnace at 700° C. and removed directly to room temperature after the desired time interval. Each group consisted of four specimens and four untreated controls, all cut from the same plate. The results are given in Table V.

The strengthening process apparently becomes less effective for the volume of the specimens for durations greater than one and one-half hours at 700° C. without a muffle. The controls demonstrate the high variability of strength between groups of specimens from different plates. The differences in porosity are not statistically significant.

The variations in the schedule for initial firing of the slip cast fused silica plates likewise have an effect on the strength of the fluoride packed and refired silica. The following examples show this effect.

EXAMPLES 36-43

Sixteen groups of specimens with four specimens in each group were prepared in the same manner as described in connection with Examples 1–10. The specimens in eight of the groups, Groups 36–43, were fired at temperatures of from 1000° C.–1200° C. for various times ranging from 1–7 hours, as set forth in Table VI.

The specimens in corresponding groups to be used as controls were fired under the same conditions.

Thereafter, the specimens of Groups 36–43 were packed in $AlF_3$ and fired at a temperature of 700° C. for 1 hour in the same manner as described in connection with Examples 1–10, and were cooled in the furnace. The controls were fired in air under the same conditions.

The specimens were tested for flexural strength in the same manner as described in connection with Examples 1–10, and the average flexural strength and the relative flexural strength of the treated materials are given in Table VI.

From these results it can be seen that the aluminum fluoride packing and refiring treatment becomes less effective as the initial firing conditions are made more severe, i.e. either the time is extended for the higher temperatures, or the temperature is increased for the shorter times. After a comparatively lengthy initial firing, fluoride treating may even be detrimental to the strength. The control strengths indicate that there is nothing to be gained by making the firing schedule more severe than two hours and 1200° C. for the part of the body of the material to be treated. The effect of the $AlF_3$ treatment on the specimens initially fired at 1000° C. for 5 hours is significant, because these specimens would have a lower or a negligible crystal content.

The mechanism responsible for the large increase in relative strength is believed to be increased sintering due to the treating.

In an effort to determine the mechanisms responsible for the increase in strength, tests were run which included a measurement of the surface crystallinity of the refired materials. These tests are as set forth below in the following examples.

EXAMPLES 44–47

A group of specimens 44 prepared as described in connection with Examples 1–10 was initially fired at 1200° C. for 2 hours and then packed in $AlF_3$ and refired at 700° C. for 1 hour in the manner described in connection with Examples 1–10. These specimens were cooled in the furnace and the surface crystallinity was determined by the method outlined by Harris, Sales, Corbett et al. ("Filament Wound Silica Radome Techniques," Appendix II, Engineering Experiment Station, Georgia Institute of Technology, Technical Report AFAL–TR–67–65: Contract AF–33(6.5)–3330, April 1967).

A reduction in thickness was also measured for these specimens. A second group of specimens 45 was similarly treated, but instead of being cooled in the furnace, they were quenched in air at room temperature.

A group of control specimens were similarly fired and refired and cooled in the furnace.

Two other groups, 46 and 47, were lapped to remove the surface layers thereof, one being lapped to remove 11 mils, and the other being lapped to remove 32 mils. The specimens of these groups were not refired.

The average flexural strength and the surface crystallinity and the average change in thickness were as given in Table VII. Typical crystallinity gradients for fluorinated specimens prepared as described in connection with Example 44 and for the corresponding controls are shown in the figure.

The treated Group 44 of specimens, which had not been quenched, had the thickness reduced by 12 mils, which would correspond to the removal of a surface layer 6 mils thick on both sides of the plate. From the crystallinity of the control, it can be seen that this is, in effect, a removal of a surface layer of high crystal content, and thus structurally weak. The surface crystallinity of the thus treated specimens corresponds well with the crystal content of the control at a depth of 6 mils.

The treated and quenched Group 45 specimens, on the other hand, had only 3 mils removed from their surfaces, and their strength was not improved. The surface had an intermediate crystal content and little strength improvement.

The lapped specimens of Groups 46 and 47, however, showed considerable improvement in strength, but even the specimens which had 32 mils removed were not as strong as the packed and refired specimens.

A comparison of strength values, thickness change and crystal content points to mechanisms that increase the strength of the fluoride treated slip cast fused silica.

The increase of strength of the specimens which were lapped shows that the removal of the surface layer does increase the strength, but the fact that their strength was not as high as the plates from which the surface layer was chemically removed together with the high relative strength of the specimens which were initially sintered at low temperature, Examples 16–19 and 36–38, shows that the fluoride atmosphere refiring does cause some additional strength increase, probably by additional sintering.

In addition to strengthening fused silica ceramic which is to be used as such, the low temperature sintering which can be carried out according to the present invention is extremely useful in preparing fiber reinforced fused silica ceramic. Fiber reinforcement of slip cast fused silica would be very desirable in many situations. For example, a radome which must pass electromagnetic waves could be greatly strengthened by inclusion of ceramic fibers. A heat insulating shield which should also shield against electromagnetic waves could be strengthened and also made to block such waves by incorporating metal fibers. However, efforts to make such reinforced slip cast fused silica have not heretofore been very successful, because while the fibers, such as fused silica cloth, in the slip cast fused silica are retained, they tend to cause extensive devitrification at conventional sintering temperatures because of the presence of sizing or other surface impurities which tend to accelerate devitrification. Although a small amount of divitrification may be desirable, it is generally accepted that devitrification should be avoided because it causes considerable loss of strength. Since the sintering temperatures according to the present invention are relatively low, as compared to conventional sintering, undesirable devitrification can be avoided.

EXAMPLES 48–51

The foregoing examples all involve packing the bodies to be strengthened in a granular fluoride material. The bodies can also be strengthened by subjecting them to vapor from the fluoride material while the bodies are kept out of contact with the solid fluoride.

Four groups of specimens, as described in connection with Examples 1–10, but initially sintered at 1000° C. for 1 hour, were treated in a hydrothermal bomb while being isolated from the solid fluoride material. The specimens of Example 48 were subjected to vapor from aluminum fluoride only, while the specimens of Examples 49–51 were subjected to vapors from mixtures of fluorides. All of the specimens except those of Example 51 were sintered at 650° C. for one hour, the specimens of Example 51 being sintered for one hour at 675° C.

The specimens were subjected to central loading on a one-half inch span, and had the strengths as shown in Table VIII. It will be seen that in comparison with the strength of the unsintered material, the sintered material had the strength greatly increased. Mixtures of fluorides seem to produce much better results.

EXAMPLE 52

Fiber reinforced fused silica ceramic was prepared by pouring a thin layer of fused silica slip on a bed of plaster of Paris, and then laying woven fused silica fiber cloth on the poured thin layer of silica slip, and then slip was poured over the cloth, and the assembly was allowed to dry. It was then fired at 1040° C. for one hour. After being machined to the desired shape, it was packed in $Al_2F_6 \cdot xH_2O$ and placed in a closed muffle and fired at 800° C. for 1 hour. When loaded on a two-inch span with four-point loading, it had a flexural strength of 4040 p.s.i. This showed that the silica was firmly sintered around the cloth.

It should be understood that in the present specimens, the strength was not imparted by the fiber reinforcement, since the cloth was on the axis of the specimen. In situations where it was desired to strengthen with the fiber, it would be located nearer the surface where it would take up bending stress.

The fibers can be any of the fibers used for such purposes, such as zirconia, alumina, aluminum silicate, graphite, and such metals as tungsten, molybdenum, and other high melting point, low coefficient of expansion metals.

EXAMPLE 53

The fluorination of slip cast fused silica can also be used when the silica ceramic has not previously been fired, i.e. it is in the "green" condition. It has been found that packing the green ceramic in a fluoride and heating it in the same manner as set forth above in connection with the previously fired ceramic produces an increase in strength of the thus fired ceramic. This is a very important application of the method of this invention, since it avoids high temperature initial firing and the devitrification and formation of cristobalite, which can be caused by the use of such high temperatures, yet the material has a strength which makes it useful.

A body of previously unfired slip cast fused silica was packed in $Al_2F_6 \cdot xH_2O$ and placed in a Morey-type hydrothermal bomb. It was fired at 600° C. for 2 hours. When loaded on a one inch span with three-point loading, it had a flexural strength of 5730 p.s.i., as compared with normal strength for air fired silica of something less than 1000 p.s.i.

In the foregoing examples, the time of firing or refiring the samples ranges from 1 to 4 hours. It will be understood that these times and the temperatures are for the volumes of the specimens described in the examples. These sizes are especially convenient for laboratory work. Larger volumes will require longer times, and smaller volumes shorter times. However, in actual practice, it may be desirable, for example when strengthening very thin pieces, which have a smaller volume, to work at the higher end of the ranges, that is, at higher temperatures, e.g. up to 1100° C. on a shorter time, e.g. as low as 30 minutes, or both a higher temperature and a shorter time.

Likewise, where large bodies are to be treated, it may be desirable to work at the lower end of the ranges, i.e. at low temperatures for long periods of time, in order to avoid undue stresses within the materials due to thermal gradients. The manner of carrying out the heating will also have a bearing on the length of time, i.e. whether the treatment is to be by means of a continuous oven or by heating batches of articles in a conventional oven. Therefore, while the range of times given is quite wide, those skilled in the art will have no difficulty in determining the proper time for the particular articles which are to be treated.

Similarly, while some of the examples include the step of cooling the articles in the kiln, it is not necessary to thus cool them, particularly where working at the lower end of the temperature range, because the articles are not heated sufficiently and the coefficient of expansion is not sufficiently great to cause thermal down shock. The exception is where a fiber reinforced article is being prepared, where there may be a difference between the coefficient of expansion of the reinforcement and the silica of the body.

As indicated above, the heat decomposable fluoride should be one which has sufficient vapor pressure at the firing or refiring temperature. However, there will be instances in which the fluoride will have too great a vapor pressure, and as a result the silica will be chemically machined, i.e. its dimensions will be reduced. This is undesirable, and in order to prevent this from happening, it has been found that a simple precautionary step can be taken. In the preparation of the fluoride for packing the article to be fired, the fluoride is mixed with about an equal proportion by weight of finely divided silica of about the same grain size, and the mixture of materials is used as the packing material. When this is done, the dimensions of the article can be kept stable.

TABLE I
$AlF_3$ treated SCFS

| | | Treating schedule | | MOR | | |
|---|---|---|---|---|---|---|
| Example | Packing material | Temp., °C. | Time, hrs. | Specimens | Controls | Increase |
| 1 | $AlF_3 \cdot xH_2O$ | 700 | 1 | 5,438 | 3,469 | 1,969 |
| 2 | $AlF_3 \cdot xH_2O$ | 700 | 1 | 5,082 | 3,884 | 1,198 |
| 3 | $AlF_3$ | 700 | 1 | 5,720 | | |
| 4 | $AlF_3 \cdot xH_2O$ | 700 | 1 | 6,290 | | |
| 5 | $AlF_3$ | 700 | 1 | 5,348 | 4,226 | 1,122 |
| 6 | $AlF_3 \cdot xH_2O$ | 700 | 1 | 5,755 | 4,226 | 1,529 |
| 7 | $AlF_3 \cdot xH_2O$ | 700 | 1 | 5,122 | 3,468 | 1,654 |
| 8 | $ZnF_2$ | 700 | 1 | 5,032 | 3,495 | 1,537 |
| 9 | $CdF_2$ | 700 | 1 | 4,898 | 3,485 | 1,413 |
| 10 | $AlF_3 \cdot xH_2O$ | 900 | 1.2 | 5,040 | 2,940 | 2,100 |

Note.—All samples are SCFS sintered at 1,200° C. for 2 hours; porosity range: 11–14%; MOR values are averages of groups of four specimens. Usually, controls were refired in air at the treating schedule.

TABLE II
Effect of atmosphere on fluoride treated SCFS "plate" specimens—Treating schedule: 700° C., 1 hr.

| | | | Average flexural strength, p.s.i. | | Average change in specimen thickness, mils |
|---|---|---|---|---|---|
| Ex. | Packing material | Atmosphere | Specimen | Control | |
| 11 | $Al_2F_6 \cdot xH_2O$ | $AlF_3$ | 5,440 | 3,370 | −21 |
| 12 | $Al_2F_6 \cdot xH_2O$ | $AlF_3$ | 5,080 | 3,880 | −10 |
| 13 | $Al_2F_6 \cdot xH_2O$ + kaolin | $AlF_3$ + $H_2O$ | 4,150 | 3,420 | −11 |
| 14 | $Al_2F_6 \cdot xH_2O$ + $As_2O_5$ | $AlF_3$ (oxidizing) | 4,730 | 3,420 | −8 |
| 15 | $Al_2F_6 \cdot xH_2O$ + C | $AlF_3$ (reducing) | 5,230 | 3,240 | −20 |

TABLE III
Effect of fluorination in a hydrothermal bomb on the flexural strength of SCFS (1 in. span, 3-point loading)

| | | | Treating schedule | | Average flexural strength, p.s.i. |
|---|---|---|---|---|---|
| Ex. | Block specimen | Bomb type | Temp., °C. | Time, hrs. | |
| 16 | Partially sintered | Fused silica ampoule | 800 | 0.5 | 5,760 |
| 17 | do | Morey | 650 | 0.5 | 4,210 |
| 18 | do | do | 650 | 2 | 6,210 |
| 19 | do | do | 650 | 5 | 5,190 |
| 20 | Fully sintered | do | 650 | 2 | 7,080 |
| | do | None | Control | | 5,100 |

TABLE IV

Effects of duration and temperature on the average flexural strength of AlF₃ treated fused silica ceramic

| Example | Duration | Temperature, °C. | | |
|---|---|---|---|---|
| | | 700 | 800 | 900 |
| 21, 22, 23 | 1 hour | 4,100 p.s.i. | 4,400 p.s.i. | 3,800 p.s.i. |
| 24, 25, 26 | 2 hours | 4,900 p.s.i. | 4,200 p.s.i. | 4,200 p.s.i. |
| 27, 28, 29 | 4 hours | 4,600 p.s.i. | 4,000 p.s.i. | 2,200 p.s.i. |

TABLE V

Fluorinated SCFS plate specimens effect of duration at 700° C.

| Ex. | Duration | Flexural strength, p.s.i. | | Percent porosity [1] | |
|---|---|---|---|---|---|
| | | Specimens | Controls | Specimens | Controls |
| 30 | 0.5 | 3,780 | 2,420 | 12.5 | 12.9 |
| 31 | 1.0 | 4,360 | 3,170 | 12.5 | 12.4 |
| 32 | 1.5 | 4,880 | 2,620 | 13.1 | 12.6 |
| 33 | 2.0 | 4,680 | 3,510 | 12.4 | 13.1 |
| 34 | 2.5 | 3,930 | 3,430 | 13.4 | 12.6 |
| 35 | 3.0 | 3,950 | 3,640 | 13.6 | 12.6 |

[1] Single value from selected specimen.

TABLE VI

Effect of sintering schedule on AlF₃ treated fused silica ceramic "plate" specimens treating schedule; 700° C., 1 hr.

| | Sintering | | Average flexural strength, p.s.i. | | Specimen, percent relative strength |
|---|---|---|---|---|---|
| | Temp., °C. | Time, hrs. | Controls | Specimens | |
| Example: | | | | | |
| 36 | 1,000 | 5 | 500 | 1,530 | 303 |
| 37 | 1,090 | 2 | 1,230 | 2,410 | 196 |
| 38 | 1,150 | 2 | 2,910 | 3,420 | 118 |
| 39 | 1,200 | 1 | 2,810 | 4,280 | 150 |
| 40 | 1,200 | 2 | 3,060 | 3,990 | 130 |
| 41 | 1,200 | 2 | 3,870 | 4,920 | 127 |
| 42 | 1,200 | 5 | 3,410 | 4,000 | 117 |
| 43 | 1,200 | 7 | 2,110 | 1,850 | 88 |

TABLE VII

Average flexural strength and percent surface crystallinity of AlF₃ treated "plate" specimens

| | Treatment | Average strength, p.s.i. | Percent surface crystallinity | Average change in thickness, mils |
|---|---|---|---|---|
| Example: | | | | |
| 44 | AlF₃ | 4,970 | 2.2 | 12 |
| 45 | AlF₃-quenched | 3,430 | 0.9 | 9 |
| | Control | 3,450 | 19.4 | |
| 46 | Lapped | 3,730 | | 1 |
| 47 | do | 4,060 | | 32 |

What is claimed is:

1. A method of strengthening fused silica ceramic comprising subjecting a body of fused silica ceramic other than a body consisting of fused silica fibers and in which at least the portion of the body to be strengthened has been sintered at conditions no more severe than 2 hours at 1200° C. to vapor from at least one heat decomposable fluoride at a vapor pressure less than that sufficient to cause undesirable chemical machining while firing at least the portion of the silica body to be strengthened at a firing condition within the range of 400°–1100° C. for a period of longer than 30 minutes, the times and temperatures being selected so that the firing conditions will give results at least as good as those achieved at conditions of 4 hours at 800° C. and so that the sintering effect is enhanced throughout the body sufficiently to substantially change the character of the bonding between grains, and thereafter cooling the thus fired body at a rate sufficiently low to avoid thermal down shock, whereby there is produced the strengthened fused silica ceramic body.

2. A method as claimed in claim 1 in which the fluoride is a fluoride taken from the group consisting of aluminum fluoride, cadmium fluoride and zinc fluoride.

3. A method as claimed in claim 2 in which the aluminum fluoride is hydrated aluminum fluoride.

4. A method as claimed in claim 1 in which the range of temperature is from 600°–900° C.

5. A method as claimed in claim 1 in which the step of subjecting the body to vapor from the fluoride comprises packing the body in the heat decomposable fluoride and firing the packed body.

6. A method as claimed in claim 1 in which the step of subjecting the body to vapor from the fluoride comprises placing the body and the heat decomposable fluoride separately and out of contact with each other in apparatus for carrying out the firing, and then carrying out firing with the body and the fluoride separate from each other.

7. A method of strengthening fused silica ceramic, comprising subjecting an unsintered body of fused silica ceramic other than a body consisting of fused silica fibers and to vapor from at least one heat decomposable fluoride at a vapor pressure less than that sufficient to cause undesirable chemical machining while firing at least the portion of the silica body to be strengthened at a firing condition within the range of 400°–1100° C. for a period of longer than 30 minutes, the times and temperatures being selected so that the firing conditions will give results at least as good as those achieved at conditions of 4 hours at 800° C. and so that the sintering effect is

TABLE VIII

Flexural strength of slip cast fused silica fluorothermally sintered in an hydrothermal bomb; specimens isolated from solid fluoride

| Example | Specimens | Vapor source | Sintering schedule | Flexural strength,* p.s.i. |
|---|---|---|---|---|
| | Glasrock SCFS presintered at 1,000° C. for 1 hr. | None | None | 600 |
| 48 | | Al₂F₆·xH₂O | 650° C. for 1 hour | 1,980 |
| 49 | | 50% ZnF₂, 50% Al₂F₆·xH₂O | do | 5,050 |
| 50 | | 33.3% ZnF₂, 33.3% Al₂F₆·xH₂O | do | 4,460 |
| 51 | | 50% ZnF₂, 50% Al₂F₆·xH₂O | 675° C. for 1 hour | 4,500 |

*One-half inch span, central loading.

enhanced throughout the body sufficiently to substantially change the character of the bonding between grains, and thereafter cooling the thus fired body at a rate sufficiently low to avoid thermal down shock, whereby there is produced the strengthened fused silica ceramic body.

References Cited

UNITED STATES PATENTS

| | | | |
|---|---|---|---|
| 3,378,498 | 4/1968 | Weatherley | 106—65 |
| 3,591,668 | 7/1971 | Kirchner et al. | 264—65 |
| 3,317,297 | 5/1967 | Ray | 65—31 |
| 3,508,895 | 4/1970 | Poole et al. | 65—31 |
| 3,630,794 | 12/1971 | Kirchner | 264—67 |

FOREIGN PATENTS

| | | | |
|---|---|---|---|
| 977,907 | 12/1964 | Great Britain | 264—82 |
| 1,213,900 | 11/1970 | Great Britain | 65—31 |

OTHER REFERENCES

H. P. Kirchner et al., "Chemically Strengthened, Leached Alumina & Spinel," April 1967, Jour. Amer. Cer. Soc., 169–173.

JOHN H. MILLER, Primary Examiner

U.S. Cl. X.R.

65—30, 31; 264—66, 82